United States Patent
Nishiwaki (10) Patent No.: US 8,477,583 B2
(45) Date of Patent: Jul. 2, 2013

(54) OPTICAL PICKUP AND OPTICAL DISC DEVICE INCLUDING THE SAME

(75) Inventor: Seiji Nishiwaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/704,700

(22) PCT Filed: Apr. 3, 2012

(86) PCT No.: PCT/JP2012/002317
§ 371 (c)(1),
(2), (4) Date: Dec. 17, 2012

(87) PCT Pub. No.: WO2012/176361
PCT Pub. Date: Dec. 27, 2012

(65) Prior Publication Data
US 2013/0107691 A1    May 2, 2013

(30) Foreign Application Priority Data
Jun. 20, 2011   (JP) .................................. 2011-136289

(51) Int. Cl.
*G11B 7/00* (2006.01)
(52) U.S. Cl.
USPC ................................. 369/112.03; 369/112.07
(58) Field of Classification Search
USPC ............. 369/112.01, 112.03, 112.05, 112.07, 369/112.04, 112.12, 44.23, 44.24
See application file for complete search history.

(56) References Cited

U.S. PATENT DOCUMENTS

| 8,023,388 | B2 | 9/2011 | Nakamura |
| 8,116,187 | B2 * | 2/2012 | Maruyama et al. ...... 369/112.07 |

(Continued)

FOREIGN PATENT DOCUMENTS

| JP | 2006-185576 A | 7/2008 |
| JP | 2009-252309 A | 10/2009 |

(Continued)

OTHER PUBLICATIONS

International Search Report for corresponding International Application No. PCT/JP2012/002317 mailed May 1, 2012.

(Continued)

*Primary Examiner* — Nabil Hindi
(74) *Attorney, Agent, or Firm* — Renner, Otto, Boisselle & Sklar, LLP (57) ABSTRACT

In an embodiment, an optical pickup includes at least one light source for selectively emitting three light beams having blue, red, and infrared wavelengths, respectively, and an objective lens arranged so that each of the three light beams enters thereto. The objective lens includes a first grating, and a second grating formed in the same plane as the first grating. The first and second gratings each have phase steps arranged concentrically around a center axis of a lens in a region in which all the three light beams pass, and are different in phase step positions. The first grating diffracts the three light beams having the blue, red, and infrared wavelengths in a $2^{nd}$ order, a $1^{st}$ order, and the $1^{st}$ order, respectively. On the other hand, the second grating diffracts the three light beams having the blue, red, and infrared wavelengths in the $1^{st}$ order, the $1^{st}$ order, and the $1^{st}$ order, respectively. As a result, the three light beams having the blue, red, and infrared wavelengths, which have been transmitted through the first grating and the second grating, are diffracted in a $3^{rd}$ order, the $2^{nd}$ order, and the $2^{nd}$ order, respectively.

5 Claims, 10 Drawing Sheets

U.S. PATENT DOCUMENTS

| | | | |
|---|---|---|---|
| 8,254,239 B2 * | 8/2012 | Komma et al. | 369/112.08 |
| 8,289,831 B2 * | 10/2012 | Yamasaki et al. | 369/112.03 |
| 2006/0114796 A1 | 6/2006 | Maruyama et al. | |
| 2006/0203692 A1 | 9/2006 | Ota et al. | |
| 2009/0009886 A1 | 1/2009 | Nishiwaki et al. | |
| 2009/0252021 A1 | 10/2009 | Inoue et al. | |
| 2012/0113518 A1 | 5/2012 | Ando et al. | |

FOREIGN PATENT DOCUMENTS

| | | |
|---|---|---|
| WO | 2006/077915 A1 | 7/2006 |
| WO | 2006/095583 A1 | 9/2006 |
| WO | 2010/128654 A1 | 11/2010 |
| WO | 2011/052188 A1 | 5/2011 |

OTHER PUBLICATIONS

International Preliminary Report on Patentability for corresponding International Application No. PCT/JP2012/002317 dated Jul. 24, 2012.

* cited by examiner

(2+1)$^{TH}$ ORDER DIFFRACTION

FIG.6B

DVD

(1+1)$^{TH}$ ORDER DIFFRACTION

(1+1)$^{TH}$ ORDER DIFFRACTION

OPTICAL PICKUP AND OPTICAL DISC DEVICE INCLUDING THE SAME

TECHNICAL FIELD

The present disclosure relates to an optical pickup for reading data recorded on an optical disc, and an optical disc device including the optical pickup.

BACKGROUND ART

Data which is recorded in an optical disc is reproduced by irradiating the rotating optical disc with a light beam having a relatively weak constant light amount, and detecting reflected light which has been modulated by the optical disc. On a read-only optical disc, information in the form of pits is recorded in a spiral manner, previously during manufacture of the optical disc. On the other hand, in the case of a rewritable optical disc, a method such as vapor deposition is used to deposit a film of a recording material which allows for optical data recording/reproduction, on the surface of a base on which tracks having spiral lands or grooves are formed. In the case where data is to be recorded on a rewritable optical disc, the optical disc is irradiated with a light beam whose light amount is modulated in accordance with the data to be recorded, thus causing local changes in the characteristics of the recording material film, whereby a data write is effected.

Note that, the depth of the pits, the depth of the tracks, and the thickness of the recording material film are small relative to the thickness of the base of the optical disc. Therefore, any portion of the optical disc where data is recorded constitutes a two-dimensional surface, and may be referred to as a "recording surface" or an "information surface". In the present specification, considering the fact that such a surface has a physical size along the depth direction, the term "information layer" is employed, instead of the term "recording surface (information surface)". An optical disc includes at least one such information layer. Note that, one information layer may in reality include a plurality of layers, e.g., a phase-change material layer and a reflective layer.

In order to read data from the optical disc and/or write data to the optical disc, an optical disc device including an optical pickup is used. The optical pickup includes a light source for emitting a light beam, an objective lens for converging the light beam emitted from the light source on the optical disc, and a photodetector for measuring, when the optical disc is irradiated with the light beam, an intensity of light reflected from the optical disc.

In recent years, as the optical disc, a Blu-ray Disc (BD), a Digital Versatile Disc (DVD), and a Compact Disc (CD) are widespread. The BD, the DVD, and the CD have equal thickness and diameter in their entireties, but are different in physical structures as well as in the distance from a surface on a light incident side of the optical disc (front surface of the optical disc) to the information layer. In addition, the reproduction and the recording of data with respect to the BD, the DVD, and the CD are performed with light beams having blue, red, and infrared wavelengths, respectively. In order to support all the BD, the DVD, and the CD by one optical disc device, the optical pickup includes at least one light source for selectively emitting the light beams having blue, red, and infrared wavelengths.

As described above, the BD, the DVD, and the CD have different distances from the front surface of the optical disc to the information layer, and hence different spherical aberrations occur with an ordinary objective lens. In this specification, the distance from the front surface of the optical disc to the information layer is referred to as "light transmitting layer thickness".

Figure 7A:
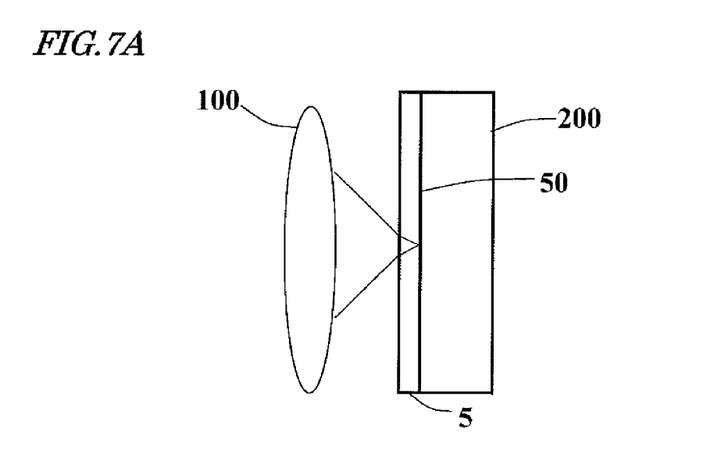
[FIG. 7A] A diagram schematically illustrating a cross-sectional configuration of a BD.
Figure 7B:
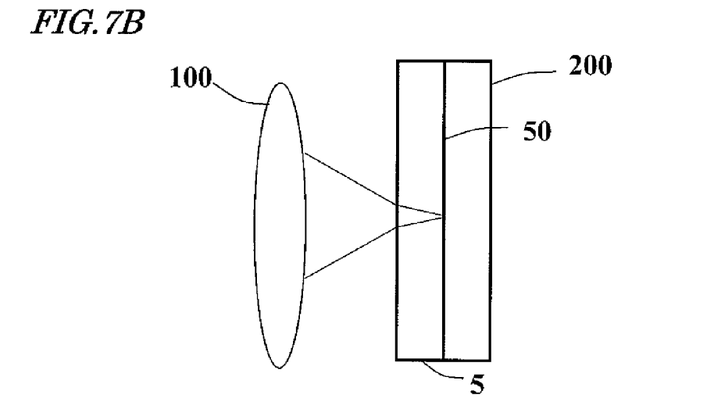
[FIG. 7B] A diagram schematically illustrating a cross-sectional configuration of a DVD.
Figure 7C:
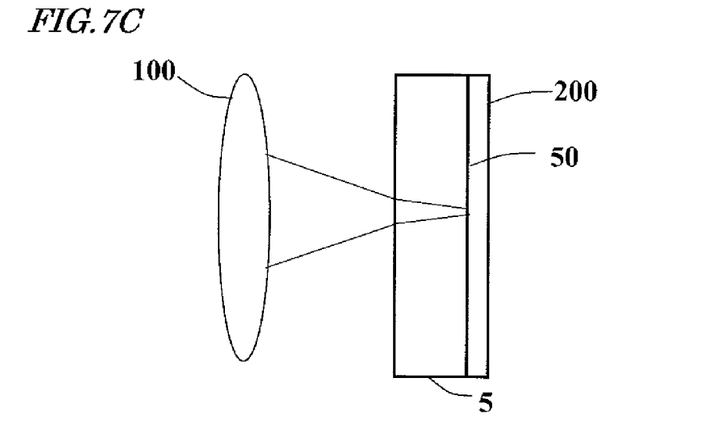
[FIG. 7C] A diagram schematically illustrating a cross-sectional configuration of a CD.

FIGS. 7A, 7B, and 7C are diagrams schematically illustrating three kinds of optical discs 200 each including a light transmitting layer 5 having a different thickness, and a light beam converged by an objective lens 100. The optical discs 200 of FIGS. 7A, 7B, and 7C correspond to a BD, a DVD, and a CD, respectively. The thickness of the light transmitting layer 5 is a distance from a surface on a light incident side of the optical disc 200 to an information layer 50. As can be seen from the figures, the light beam that has been transmitted through the objective lens 100 is transmitted through the light transmitting layer 5 of each of the optical discs 200 to be converged on the information layer 50.

Figure 8:
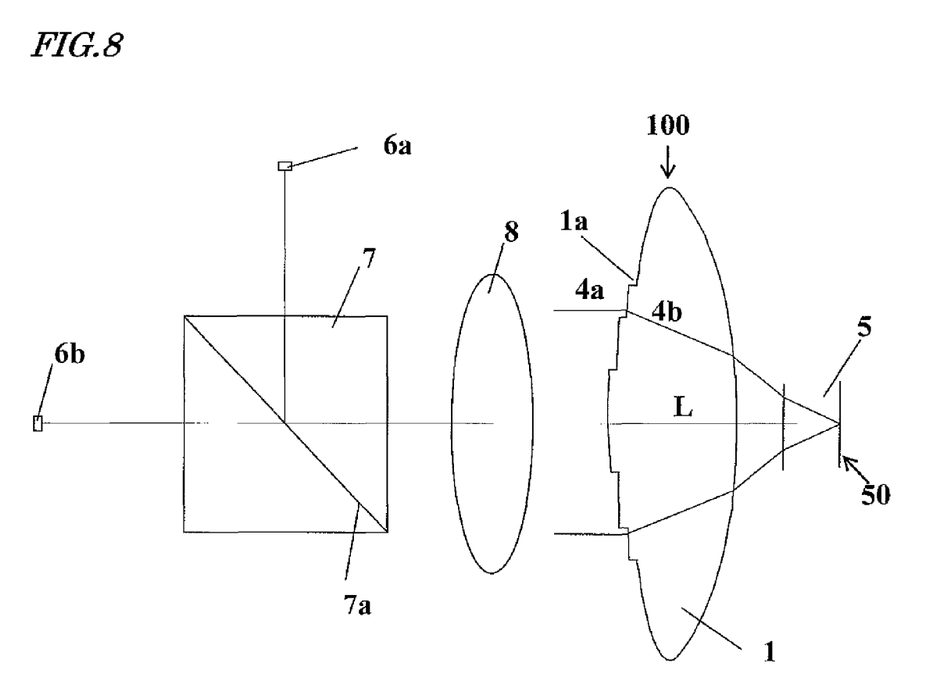
[FIG. 8] A cross-sectional configuration diagram of an optical disc device according to a conventional example.
Figure 9A:
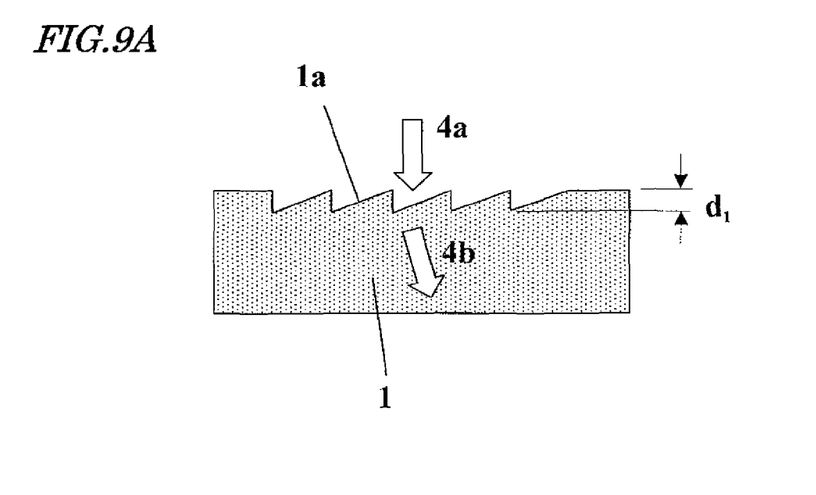
[FIG. 9A] A diagram illustrating a cross-sectional shape of a grating according to the conventional example.
Figure 9B:
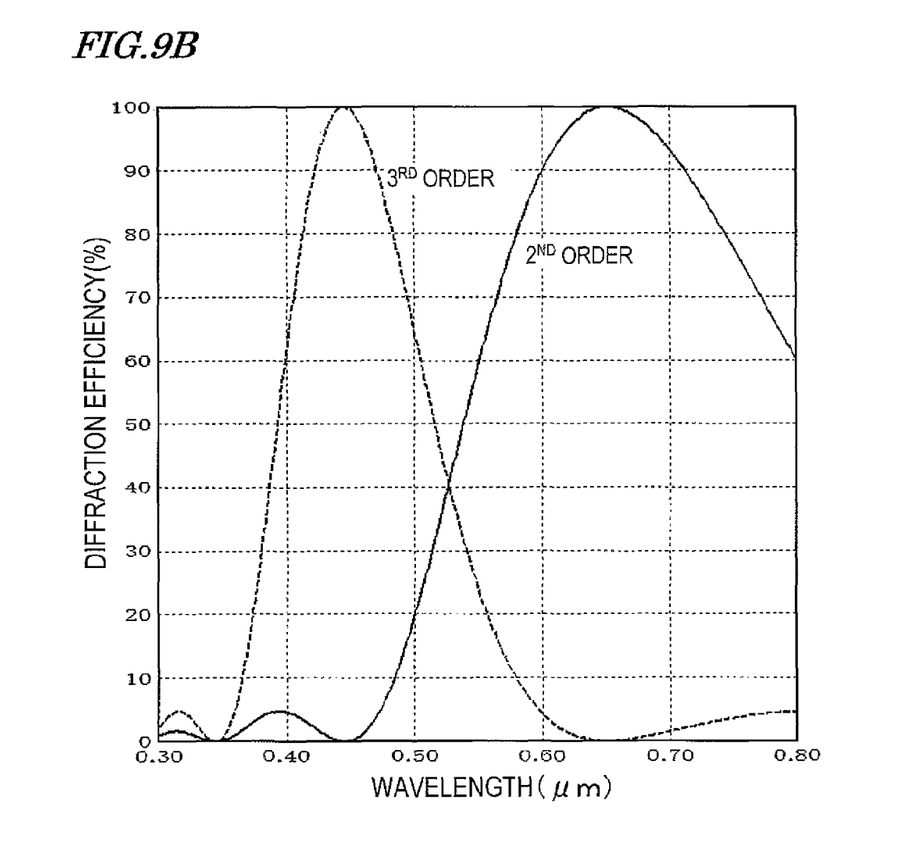
[FIG. 9B] A graph showing a relationship of a diffraction efficiency with respect to a wavelength at a grating according to the conventional example.

Referring to FIGS. 8 and 9, a configuration example of a conventional optical pickup and a configuration of the objective lens 100 included in the optical pickup are described below.

First, referring to FIG. 8, the configuration example of the known optical pickup is described. For simplicity, FIG. 8 illustrates only a configuration on a forward path side (side from the light source to a disc surface), and a configuration on a return path side (side from the optical disc to a photodetector) is omitted. In the example illustrated in FIG. 8, first, a case is assumed where a BD is loaded in the optical disc device. In this case, blue light (having a wavelength of 0.405 μm) is emitted from a light source 6a such as blue-light emitting semiconductor laser. The blue light beam emitted from the light source 6a is reflected on a dichroic mirror prism 7, and travels through a collimating lens 8 so as to be converted into plane waves 4a. The dichroic mirror prism 7 is configured to reflect light having the blue wavelength, and transmit light having red and infrared wavelengths. The optical system of this example causes the plane waves 4a to enter the objective lens 100, and hence is an "infinite system". The blue light beam travels through the objective lens 100, is transmitted through the light transmitting layer 5 having a thickness of 0.1 mm, and is converged on the information layer 50. The BD includes, as illustrated in FIG. 7A, an optical disc base 200 having a thickness of 1.1 mm and the light transmitting layer 5 having a thickness of 0.1 mm and the information layer 50 is positioned between the disc base and the light transmitting layer 5. The light transmitting layer in the BD is constituted of a protective layer having a thickness of 0.1 mm. Note that, a DVD has a structure in which a pair of disc bases each having a thickness of 0.6 mm are bonded together, and the information layer 50 is positioned between the pair of disc bases. Therefore, the light transmitting layer 5 in the DVD corresponds to one disc base having the thickness of 0.6 mm, and hence the light transmitting layer thickness is 0.6 mm. On the other hand, a CD includes a disc base having a thickness of 1.2 mm, and the information layer 50 is positioned on a rear surface side of the disc base. Therefore, the light transmitting layer 5 in the CD corresponds to the disc base having the thickness of about 1.2 mm, and hence the light transmitting layer thickness is 1.2 mm.

When a DVD or a CD is loaded in the optical disc device, the light beam having a red wavelength or the light beam having an infrared wavelength is emitted from a light source 6b. The light source 6b includes a red semiconductor laser and an infrared semiconductor laser arranged in one package. The red or infrared light (having a wavelength of 0.660 μm or 0.785 μm) emitted from the semiconductor laser light source 6b for independently emitting two wavelengths of red and infrared is transmitted through the dichroic mirror prism 7, and travels through the collimating lens 8 to be converted into the plane waves 4a. Thereafter, the red or infrared light beam travels through the objective lens 100 and is transmitted though the light transmitting layer 5 having a thickness of 0.6 or 1.2 mm to be converged on the information layer 50. The optical system in this example also causes the plane waves 4a to enter the objective lens 100, and hence is an "infinite system".

The objective lens 100 is formed of a transparent medium (such as glass or plastic), and has a center axis corresponding to an optical axis L. The objective lens 100 includes a surface on which a grating 1a having a sawteeth-like cross section is formed. Phase step portions of the grating 1a are arranged concentrically around the optical axis L. The grating 1a is set so as to diffract the blue wavelength in the $3^{rd}$ order and diffract the red and infrared wavelengths in the $2^{nd}$ order.

FIG. 9A illustrates a part of the cross-sectional shape of the grating in the conventional example. The grating 1a having a depth $d_1$ diffracts incident light 4a to obtain diffracted light 4b. FIG. 9B shows a relationship of a diffraction efficiency with respect to a wavelength in a case where the transparent medium forming a lens base 1 of the objective lens 100 is Zeonex 350 (having a refractive index $n_d$=1.50620 and an Abbe number $u_d$=56.3877) and the depth $d_1$ of the grating 1a is 2.58 μm. When the wavelength is 0.405 μm, the efficiency of the $3^{rd}$-order diffracted light is 69.5%, and the efficiencies of the $2^{nd}$-order diffracted light are 99.7% and 65.2% for the wavelengths of 0.660 and 0.785 μm, respectively.

Next, the objective lens 100 in this conventional example is considered in terms of aberrations. A case is assumed where an optical disc has a light transmitting layer thickness of x and an objective lens is designed to cancel the spherical aberration (base aberration) occurring from the light transmitting layer thickness. By adding a grating to the lens, the base aberration and the spherical aberration of the light transmitting layer thickness are both absorbed. In this case, it can be considered that the spherical aberration corresponding to the light transmitting layer thickness (0.1−x) is added to the light having the blue wavelength $\lambda_1$ due to the diffraction, the spherical aberration corresponding to the light transmitting layer thickness (0.6−x) is added to the light having the red wavelength $\lambda_2$, and the spherical aberration corresponding to the light transmitting layer thickness (1.2−x) is added to the light having the infrared wavelength $\lambda_3$. In practice, there are dispersion effects of the lens material and the disc base, and as the wavelength becomes shorter, the refractive index of the disc or the lens becomes larger and the difference in spherical aberrations becomes larger at the same time. When the increase in spherical aberrations is converted into a difference in light transmitting layer thickness and aberration change amounts for the blue wavelength $\lambda_1$, the red wavelength $\lambda_2$, and the infrared wavelength $\lambda_3$ are denoted by $t_1$, $t_2$, $t_3$ (provided that the infrared wavelength is used as a reference of dispersion and is set to $t_3$=0), the aberration influences on the positive side of the difference in light transmitting layer thickness more as the wavelength becomes shorter, to thereby satisfy the condition $t_1 > t_2 > t_3 = 0$. Therefore, the diffraction adds the spherical aberration corresponding to the light transmitting layer thickness (0.1−x+$t_1$) to the light having the blue wavelength $\lambda_1$, the spherical aberration corresponding to the light transmitting layer thickness (0.6−x+$t_2$) to the light having the red wavelength $\lambda_2$, and the spherical aberration corresponding to the light transmitting layer thickness (1.2−x+$t_3$) to the light having the infrared wavelength $\lambda_3$.

On the other hand, the phase change (aberration) that occurs due to the diffraction is proportional to the diffraction order multiplied by the wavelength, and hence, when the diffraction order at the grating is the $p^{th}$-order for the blue wavelength $\lambda_1$, the $q^{th}$-order for the red wavelength $\lambda_2$, and the $r^{th}$-order for the infrared wavelength $\lambda_3$, the following equation is satisfied:

$$(0.1-x+t_1):(0.6-x+t_2):(1.2-x+t_3)=p\lambda_1:q\lambda_2:r\lambda_3. \quad \text{(Equation 1)}$$

When it is assumed that q=r, $\lambda_1$=0.405 μm, $\lambda_2$=0.660 μm, and $\lambda_3$=0.785 μm and it is approximated that $t_2$=$t_3$=0 because the dispersion is small for red or longer wavelengths, x=−2.57 mm from (Equation 1) and the following equation is established:

$$p/q=660(0.1-x+t_1)/405(0.6-x)=1.37+0.51*t_1 \quad \text{(Equation 2)}$$

where $t_1$ is a positive value and can be adjusted from below 0.1 to about 0.2 by a variation value of the lens material. For example, p/q≈1.4 when a material having a low dispersion is used, but may be increased by using a material having a high dispersion to p/q≈1.5. A combination that is closest to the condition of (Equation 2) and lowest in order is p=3 and q=r=2. In other words, the relationship of p=3 and q=r=2 is the condition that can minimize the aberration occurring from the difference in light transmitting layer thickness.

As described above, in the optical disc device of the conventional example, even with the configuration in which light 4a parallel to the objective lens 100 is caused to enter, the aberrations occurring from the three different light transmitting layer thicknesses of the discs may be minimized, and a certain light utilization efficiency (diffraction efficiency) may be maintained for the three different wavelengths. Further, the light 4a incident on the objective lens 100 may be converted into the plane waves, and hence the positional adjustment between the objective lens 100 and the incident light 4a is facilitated and the aberration occurring from the tracking shift of the objective lens 100 may be suppressed. Therefore, a smaller and cheaper optical system may be provided.

CITATION LIST

Patent Literature

Patent Document No. 1: International Patent WO2006/077915

SUMMARY OF INVENTION

Technical Problem

It is desired that a chromatic aberration and a spherical aberration be further suppressed for light of three wavelengths. According to embodiments of the present invention, the chromatic aberration and the spherical aberration can be further suppressed.

Solution to Problem

According to an embodiment of the present invention, there is provided an optical pickup, including: at least one light source for selectively emitting three light beams having blue, red, and infrared wavelengths, respectively; and an objective lens arranged so that each of the three light beams enters thereto, in which the objective lens has a blazed grating structure, the blazed grating structure includes: a first grating having phase steps arranged concentrically around a center axis of a lens in a region in which all the three light beams pass, for diffracting the three light beams having the blue, red, and infrared wavelengths in a $2^{nd}$ order, a $1^{st}$ order, and a $1^{st}$ order, respectively; and a second grating formed in the same plane as the first grating and having phase steps arranged concentrically around the center axis of the lens in the region in which all the three light beams pass at positions different from positions of the phase steps of the first grating, for diffracting the three light beams having the blue, red, and infrared wavelengths in a $1^{st}$ order, a $1^{st}$ order, and a $1^{st}$ order, respectively, and the objective lens diffracts the three light beams having the blue, red, and infrared wavelengths in a $3^{rd}$ order, the $2^{nd}$ order, and the $2^{nd}$ order, respectively.

According to an embodiment of the present invention, there is provided an optical disc device, including: a driver unit for rotating an optical disc; the above-mentioned optical pickup; and a control unit for controlling the optical pickup and the driver unit so as to read data recorded on the optical disc by the optical pickup.

Advantageous Effects of Invention

According to the embodiments of the present invention, a high diffraction efficiency may be ensured for three wavelengths of blue, red, and infrared with a single lens. Further, the aberration and the chromatic aberration occurring from the three different light transmitting layer thicknesses may be reduced by using an optical material having a low dispersion. Further, the light incident on the lens may be configured as the infinite system, and hence the occurrence of the aberration may be suppressed and the optical configuration may be simplified.

DESCRIPTION OF EMBODIMENTS

The inventor of the present invention has found that the conventional optical disc device has the following problem.

Specifically, the combination of p=3 and q=r=2 is closest to (Equation 2), but there is still a deviation (that is, aberration). When an optical pickup is actually designed based on the guidelines of (Equation 1) and (Equation 2), with the conditions that a numerical aperture (NA) is 0.5 and the lens material is Zeonex 350 ($n_d$=1.50620, $u_d$=56.3877), aberrations for the DVD and the CD may be reduced to about 14 and 6 m$\lambda$, respectively, but an aberration of 79 m$\lambda$ remains on the BD side (design plan A). In order to reduce the aberration, when the material of a lens base 1 is changed to a material having a high dispersion (for example, O-PET by Kanebo Ltd.), the aberration may be reduced but the chromatic aberration on the BD side (change in focal position on the order of μm accompanying a wavelength fluctuation of 1 nm) is increased, with the result that the target value of 0.3 μm/nm or lower cannot be maintained.

According to an embodiment of the present invention, there is provided an optical pickup, including: at least one light source for selectively emitting three light beams having blue, red, and infrared wavelengths, respectively; and an objective lens arranged so that each of the three light beams enters thereto, in which the objective lens has a blazed grating structure, the blazed grating structure includes: a first grating having phase steps arranged concentrically around a center axis of a lens in a region in which all the three light beams pass, for diffracting the three light beams having the blue, red, and infrared wavelengths in a $2^{nd}$ order, a $1^{st}$ order, and a $1^{st}$ order, respectively; and a second grating formed in the same plane as the first grating and having phase steps arranged concentrically around the center axis of the lens in the region in which all the three light beams pass at positions different from positions of the phase steps of the first grating, for diffracting the three light beams having the blue, red, and infrared wavelengths in a $1^{st}$ order, a $1^{st}$ order, and a $1^{st}$ order, respectively, and the objective lens effectively diffracts the three light beams having the blue, red, and infrared wavelengths in a $3^{rd}$ order, the $2^{nd}$ order, and the $2^{nd}$ order, respectively.

In an embodiment, when n is an integer of 1 or more, a position of an n-th phase step of the first grating counted from the center axis of the lens is located on an outer circumference side with respect to a position of an n-th phase step of the second grating counted from the center axis of the lens.

In an embodiment, the phase steps of the first grating are deeper than the phase steps of the second grating, and the blazed grating structure includes a region in which two kinds of phase steps having different depths are arranged alternately in a radial direction of the lens.

In an embodiment, the blazed grating structure is defined by a phase function obtained by adding a phase function defining the first grating and a phase function defining the second grating.

According to this embodiment, there is provided an optical disc device, including: a driver unit for rotating an optical disc; the optical pickup as described in any one of the above-mentioned embodiments; and a control unit for controlling the optical pickup and the driver unit so as to read data recorded on the optical disc by the optical pickup.

An embodiment of the present invention is described below in more detail.

First, an optical pickup according to this embodiment is described. The optical pickup includes at least one light source for selectively emitting three light beams having blue, red, and infrared wavelengths, respectively, and an objective lens arranged so that each of the three light beams enters thereto.

The above-mentioned objective lens has a blazed grating structure. The blazed grating structure includes a first grating, and a second grating formed in the same plane as the first grating. The first and second gratings each have phase steps arranged concentrically around a center axis of a lens in a region in which all the three light beams pass, and are different in phase step positions. The first grating diffracts the three light beams having the blue, red, and infrared wavelengths in a $2^{nd}$ order, a $1^{st}$ order, and a $1^{st}$ order, respectively. On the other hand, the second grating diffracts the three light beams having the blue, red, and infrared wavelengths in a $1^{st}$ order, a $1^{st}$ order, and a $1^{st}$ order, respectively. As a result, the three light beams having the blue, red, and infrared wavelengths, which have been transmitted through the first grating and the second grating, are diffracted in a $3^{rd}$ order, the $2^{nd}$ order, and the $2^{nd}$ order, respectively.

In the embodiment of the present invention, the first grating and the second grating are separated in the same plane and separately provide a diffractive action, and may exert a diffractive action in the order obtained by adding the diffraction orders of the two gratings as a whole.

Further, the phrase "the first grating and the second grating are formed in the same plane" may be rephrased as: "the first grating and the second grating are formed in one of two surfaces of the objective lens, that is, a surface on the side to which the laser beam enters and a surface on the side from which the laser beam exits."

Note that, the first grating and the second grating may be formed on any one of the surface on the side to which the laser beam enters and the surface on the side from which the laser beam exits.

Note that, when n is an integer, the phrase "the grating diffracts the light beam in the $n^{th}$ order" as used herein means that: "of the diffracted light in a plurality of orders generated by the diffraction of the grating, a diffraction efficiency of the $n^{th}$-order diffracted light is the highest." Further, the phrase "the light beam having the blue wavelength is refracted in the $n^{th}$ order" means that at least one wavelength at which the diffraction efficiency of the $n^{th}$-order diffracted light becomes highest exists in the blue band. The same applies to the diffraction of the light beams having the red and infrared wavelengths.

(First Embodiment)

Figure 1:
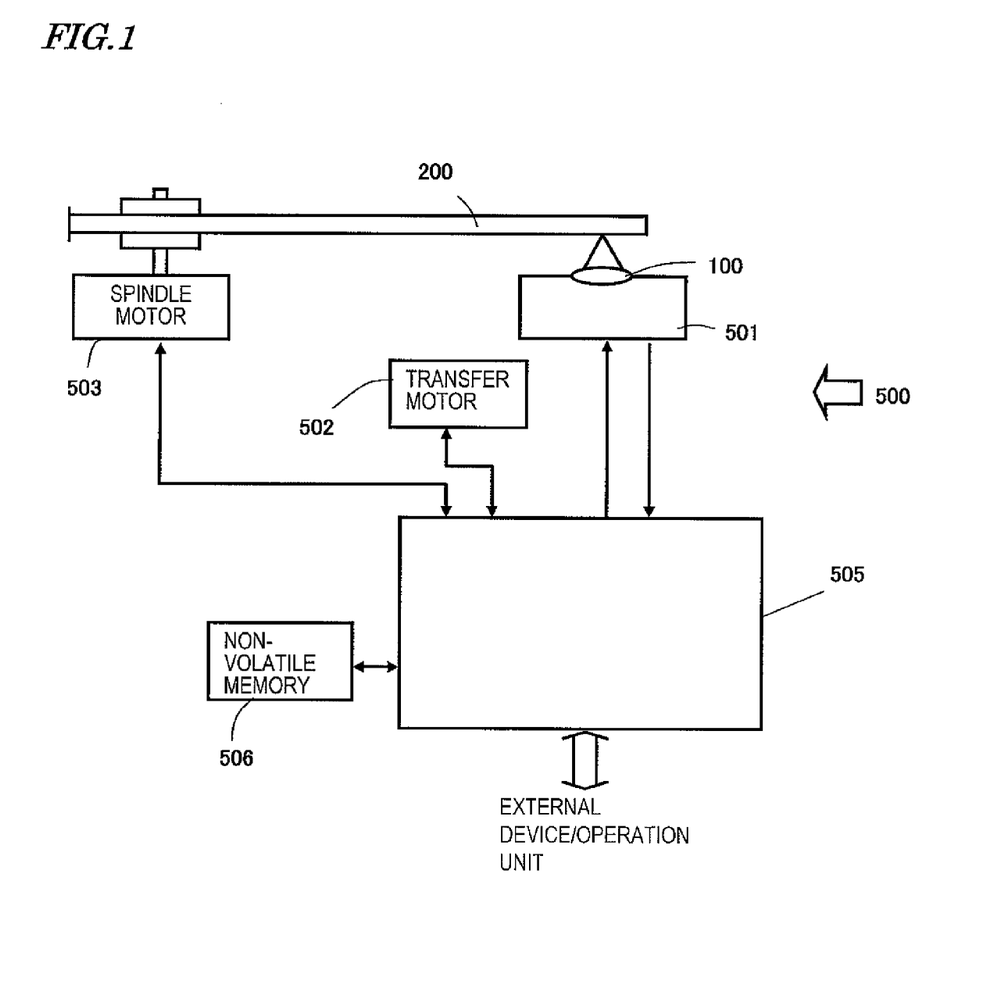
[FIG. 1] A block diagram illustrating a configuration example of an optical disc device according to an embodiment of the present invention.

First, referring to FIG. 1, a configuration example of an optical disc device according to this embodiment including the above-mentioned optical pickup is described. An optical disc device 500 illustrated in FIG. 1 may be preferably used as an optical drive of a personal computer, an optical disc player, an optical disc recorder, or the like. Note that, also in the other embodiments described below, components other than the objective lens are similar to those of this embodiment. Therefore, for the other embodiments, description of the components of the optical disc device is omitted.

FIG. 1 is a block diagram illustrating a configuration example of the optical disc device 500. The optical disc device 500 includes an optical pickup 501, a spindle motor (driver unit) 503 for rotating an optical disc 200, a transfer motor 502 for controlling a position of the optical pickup 501, a control unit 505 for controlling operations of the above-mentioned units, and a non-volatile memory 506. As the optical disc 200, a BD, a DVD, or a CD may be loaded in the optical disc device 500.

Data optically read from the optical disc 200 loaded in the optical disc device 500 is converted into an electrical signal by a light receiving element (not shown) of the optical pickup 501 and input to the control unit 505. The optical pickup 501 includes known components such as a light source (semiconductor laser) for emitting a light beam, an objective lens 100 for converging the light beam to form a light spot on the optical disc 200, and an actuator for driving the objective lens 100.

The control unit 505 generates, based on the electrical signal obtained from the optical pickup 501, a servo signal including a focus error signal and a tracking error signal, and performs waveform equalization of a reproduction signal, binarization slicing, and analog signal processing of synchronization data or the like. The control unit 505 includes a system controller and the like, and is preferably realized by a combination of software and hardware.

The control unit 505 controls the light spot, which is formed by the optical pickup 501 on the optical disc 200, to follow a target track of the rotating optical disc 200 based on the generated servo signal. The control unit 505 realizes a series of control including focus control and tracking control of the objective lens 100 included in the optical pickup 501, transfer control of the optical pickup 501, spindle motor control, and the like by a digital servo. In other words, the control unit 505 serves to properly drive the actuator (not shown) for the objective lens 100, as well as the transfer motor 502 for transferring the optical pickup 501 to an inner circumference or an outer circumference of the optical disc 200, and the spindle motor 503 for rotating the optical disc 200. Note that, the control unit 505 may be realized by a semiconductor integrated circuit (IC). The non-volatile memory 506 stores software executed by the control unit 505, various parameters, and the like.

Figure 2:
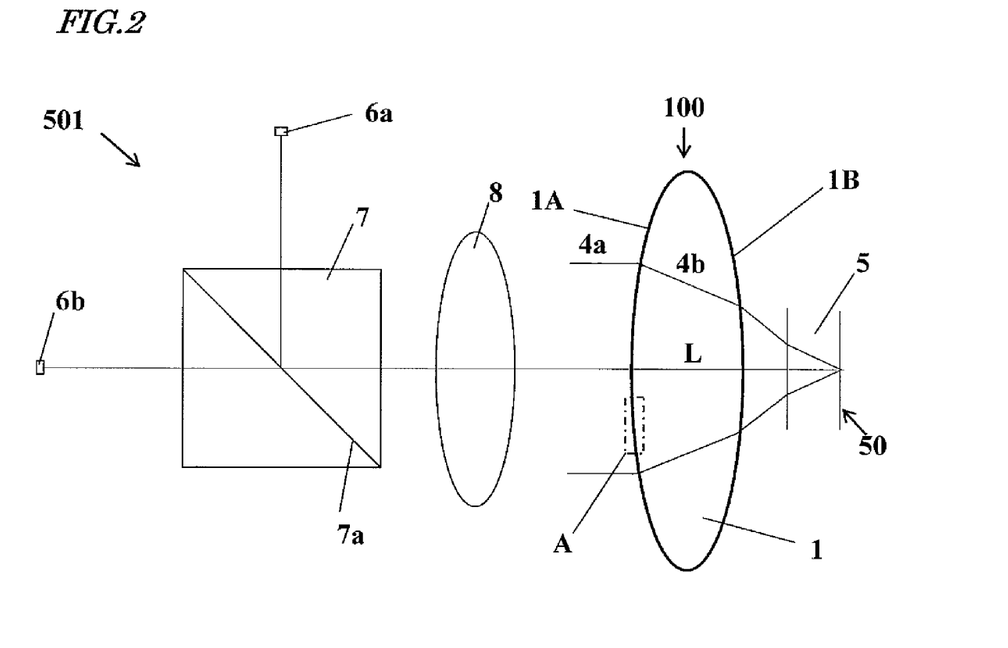
[FIG. 2] A cross-sectional configuration diagram of an optical pickup according to the first embodiment.

Next, referring to FIGS. 2 to 6C, a configuration example of the optical pickup 501 included in the optical disc device of this embodiment is described. FIG. 2 illustrates a cross-sectional configuration of the optical pickup 501 according to the first embodiment. For simplicity, FIG. 2 illustrates only a configuration on a forward path side (side from the light source to a disc surface), and a configuration on a return path side (side from the disc surface to a photodetector) is omitted.

As illustrated in FIG. 2, blue light (having a wavelength of 0.405 μm) emitted from a light source 6a such as a blue-light emitting semiconductor laser is reflected on a dichroic mirror prism 7, and travels through the collimating lens 8 so as to be converted into plane waves 4a. The dichroic mirror prism 7 is configured to reflect light having the blue wavelength, and transmit light having the red and infrared wavelengths. The optical system of this example causes the plane waves 4a to enter the objective lens 100, and hence is an "infinite system".

The blue light beam reflected on the dichroic mirror prism 7 travels through the objective lens 100, is transmitted through a light transmitting layer 5 having a thickness of 0.1 mm, and is converged on an information layer 50.

When a DVD or a CD is loaded in the optical disc device, the light beam having a red wavelength or the light beam having an infrared wavelength is emitted from a light source 6b. The light source 6b includes a red semiconductor laser and an infrared semiconductor laser arranged in one package. The red light (having a wavelength of 0.660 μm) or infrared light (having a wavelength of 0.785 μm) emitted from the semiconductor laser light source 6b for independently emitting two wavelengths of red and infrared is transmitted through the dichroic mirror prism 7, and travels through the collimating lens 8 to be converted into the plane waves 4a. Thereafter, the red or infrared light beam travels through the objective lens and is converged on the information layer of the corresponding optical disc. More specifically, when the DVD is loaded in the optical disc device, the red light beam is transmitted through a light transmitting layer having a thickness of 0.6 mm and converged on the information layer 50. On the other hand, when the CD is loaded in the optical disc device, the infrared light beam is transmitted through a light transmitting layer having a thickness of 1.2 mm and converged on the information layer 50. The optical system in this example also causes the plane waves 4a to enter the objective lens 100, and hence is an "infinite system".

The objective lens 100 in this embodiment is made of the lens base 1 having a lens shape. In an embodiment, as the lens base 1, Zeonex 350 (refractive index: 1.50662, Abbe number: 56.388), which is a UV resistant resin, may be used. The lens base 1 includes a surface 1A on which gratings 1a and 1b having a sawteeth-like cross section are formed, and the gratings 1a and 1b are oriented along a circumference around an optical axis L.

Figure 3A:
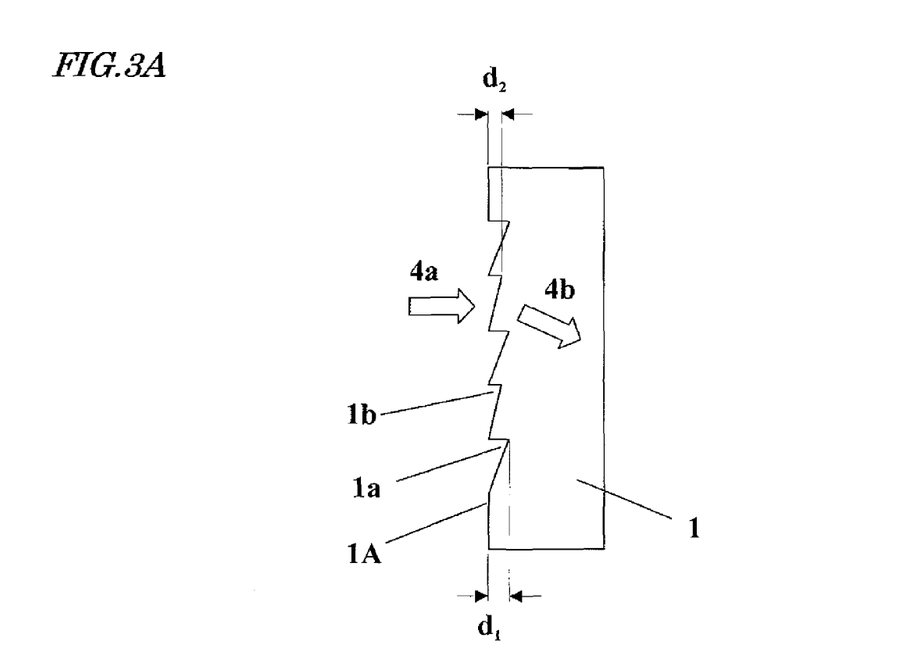
[FIG. 3A] A cross-sectional configuration diagram of grating surface (1A) according to the first embodiment.

FIG. 3A illustrates an example of a cross-sectional configuration of the gratings at a portion A (see FIG. 2) in the surface 1A of the lens base 1 according to the first embodiment.

The objective lens 100 according to this embodiment has the blazed grating structure in which the first grating 1a and the second grating 1b are combined. In the example of FIG. 3A, normals of step side surfaces of the gratings 1a and 1b are oriented toward the outer circumference side. More specifically, the normals (sawteeth) extending from the high refractive index side to the low refractive index side of the step side surfaces of the gratings 1a and 1b are oriented away from the center of the lens. The sawteeth may be oriented inward depending on the design or in different directions depending on the position, but the grating 1a and the grating 1b are oriented synchronously in substantially the same direction.

Note that, when the phase step positions are counted from the center and n is an integer of 1 or more, the n-th phase step position of the grating 1a is located on the outer circumference side with respect to the n-th phase step position of the grating 1b. Therefore, the phase step positions of the grating 1a and the grating 1b are different from each other. As an example, when a phase function with respect to a radius r of each grating is expressed as $\phi(r)$ and a constant a is set to a value in the vicinity of 1.0, a phase function of the grating 1a may be defined as $\phi/a$ and a phase function of the grating 1b may be defined as $\phi \times a$. Alternatively, different constants may be added to the phase functions of the grating 1a and the grating 1b so that the gratings have different phase step positions.

Figure 10:
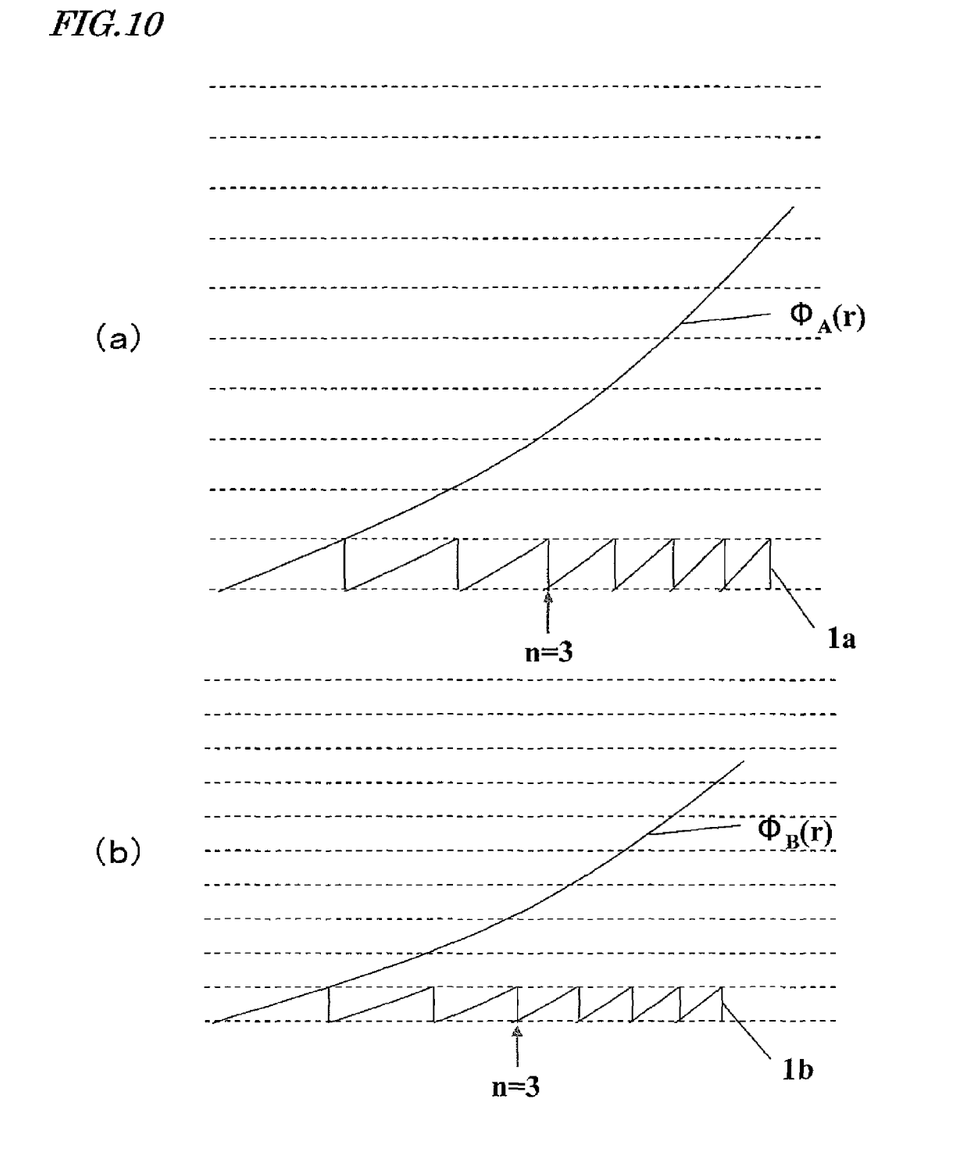
FIG. 10(a) is a graph showing a phase function $\Phi_A(r)$ defining the first grating (1a)
FIG. 10(b) is a graph showing a phase function $\Phi_B(r)$ defining the second grating (1b).

FIG. 10(a) is a graph schematically showing an example of a phase function $\phi_A(r)$ defining the grating 1a, FIG. 10(b) is a graph schematically showing an example of a phase function $\phi_B(r)$ defining the grating 1b. The vertical axis represents the phase and the horizontal axis represents the distance (position in the radial direction) r from the center axis of the lens. The interval between broken lines corresponds to a phase difference $2\pi$ corresponding to the diffraction order of each grating. FIGS. 10(a) and 10(b) show sawteeth-like protrusions and depressions formed by combining parts of curves of the phase functions $\phi_A(r)$ and $\phi_B(r)$ in a phase range of 0 to $2\pi$, respectively. Those protrusions and depressions show a cross-sectional shape when each of the grating 1a and the grating 1b is extracted independently. The blazed grating structure actually provided on the lens has a cross-sectional shape in which the grating 1a and the grating 1b are combined.

As can be seen from the figures, the phase steps of the grating 1a and the phase steps of the grating 1b are different in positions in the radial direction. For example, the position of the $(n=3)^{th}$ phase step of the grating 1a counted from the center axis of the lens is located on the outer side with respect to the position of the $(n=3)^{th}$ phase step of the grating 1b counted from the center axis of the lens. Such positional relationship is not limited to the case where n=3.

The blazed grating structure according to this embodiment is defined by $\phi_A(r)+\phi_B(r)$. The blazed grating structure has phase step positions that match the phase step positions shown in FIGS. 10(a) and 10(b), and depths of the phase steps that are equal to the depths of the phase steps shown in FIGS. 10(a) and 10(b) at corresponding positions. This can be regarded as a relationship in which the two kinds of gratings 1a and 1b having different step depths are laminated and the distance of the gratings 1a and 1b in the direction of the center axis of the lens is zero (the two gratings are arranged in the same plane).

In the blazed grating structure, the phase steps of the grating 1a are deeper than the phase steps of the second grating 1b. Further, there is a region in which the two kinds of phase steps having different depths are arranged alternately in the radial direction of the lens.

Figure 3B:
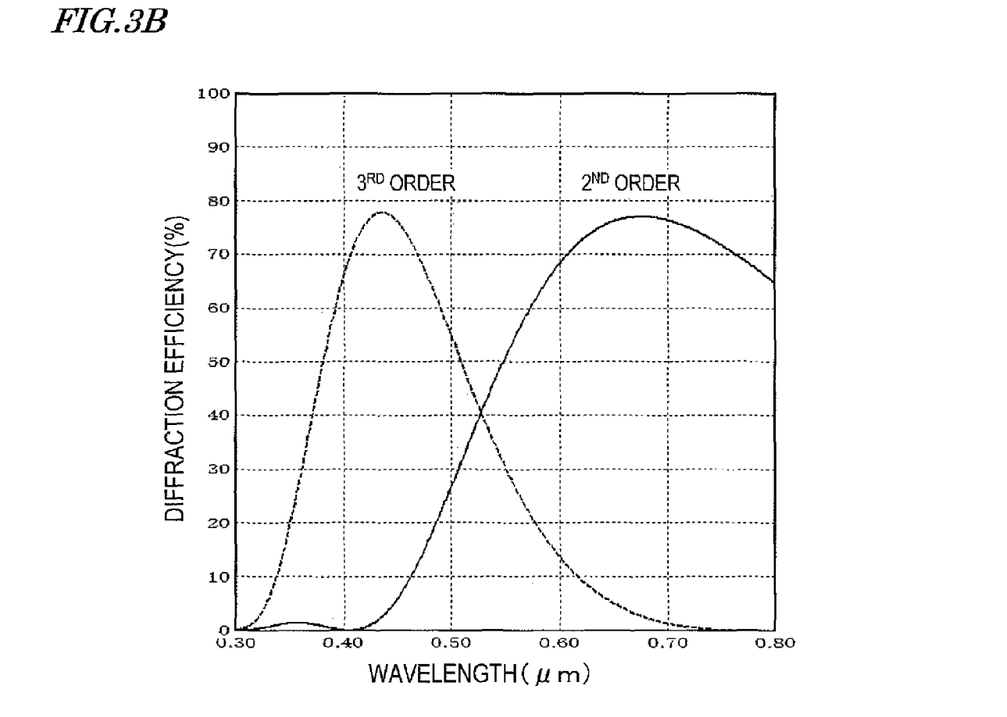
[FIG. 3B] A graph showing a relationship of a diffraction efficiency with respect to a wavelength at the grating surface (1A) according to the first embodiment.

The gratings 1a and 1b are separated in the same plane with the directions of the grating vectors being aligned. In other words, the positions of the corresponding phase steps in the radial direction of are different. Therefore, the diffraction occurs independently for each of the gratings, and the diffraction occurs in the order obtained by adding the diffraction orders of the gratings as a whole. Therefore, when the diffraction order of the grating 1a is set to the $2^{nd}$ order for the blue wavelength and the $1^{st}$ order for the red and infrared wavelengths and the diffraction order of the grating 1b is set to the $1^{st}$ order for the blue, red, and infrared wavelengths, the gratings 1a and 1b diffract incident light 4a to obtain diffracted light 4b so that the diffraction order becomes the $3^{rd}$ order, the $2^{nd}$ order, and the $2^{nd}$ order for the blue, red, and infrared wavelengths. FIG. 3B shows a relationship of a diffraction efficiency with respect to a wavelength when a depth $d_1$ of the grating 1a is 1.55 μm and a depth $d_2$ of the grating 1b is 1.03 μm. When the wavelength is 0.405 μm, the efficiency of the $3^{rd}$-order diffracted light is 69.2%, and for the wavelengths of 0.660 and 0.785 μm, the efficiencies of the $2^{nd}$-order diffracted light are 76.8% and 66.9%, respectively.

Figure 4A:
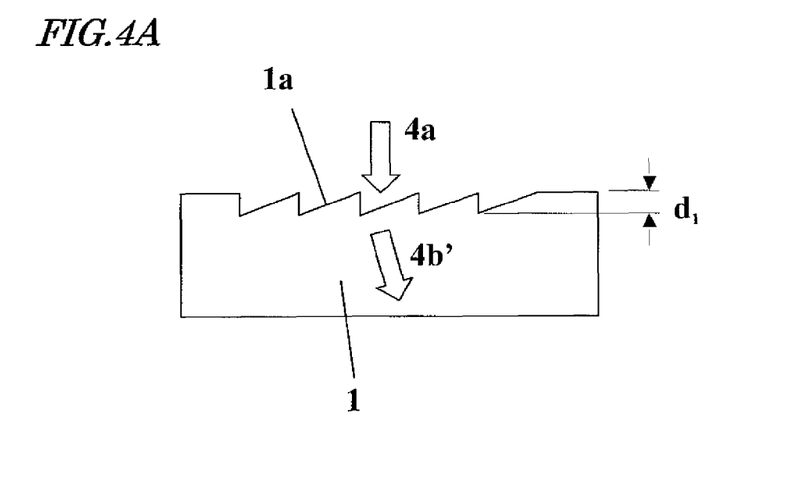
[FIG. 4A] A diagram illustrating a cross-sectional shape of a grating (1a) according to the first embodiment.
Figure 4B:
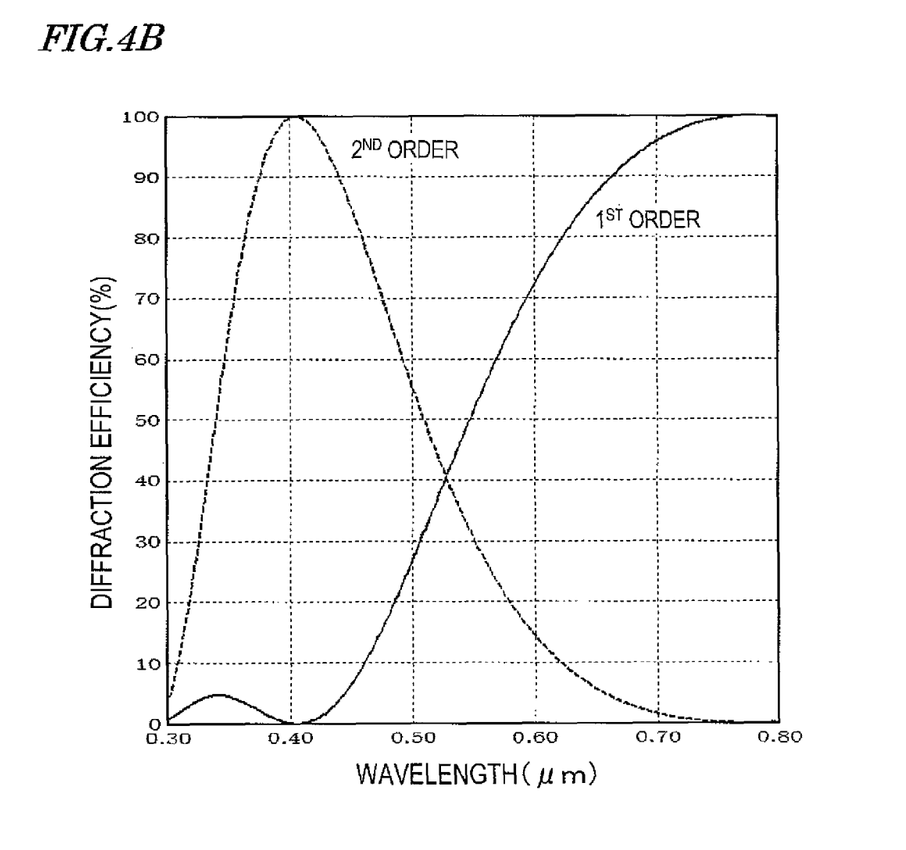
[FIG. 4B] A graph showing a relationship of a diffraction efficiency with respect to a wavelength at the grating (1a) according to the first embodiment.
Figure 5A:
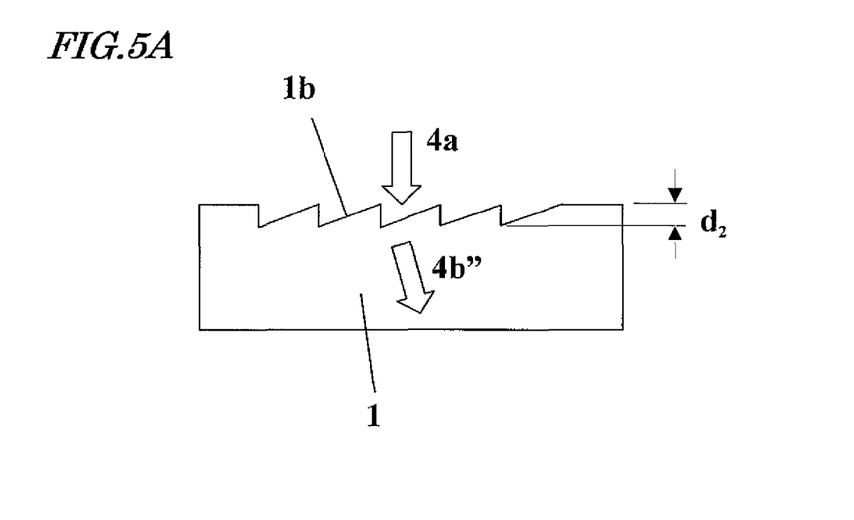
[FIG. 5A] A diagram illustrating a cross-sectional shape of a grating (1b) according to the first embodiment.
Figure 5B:
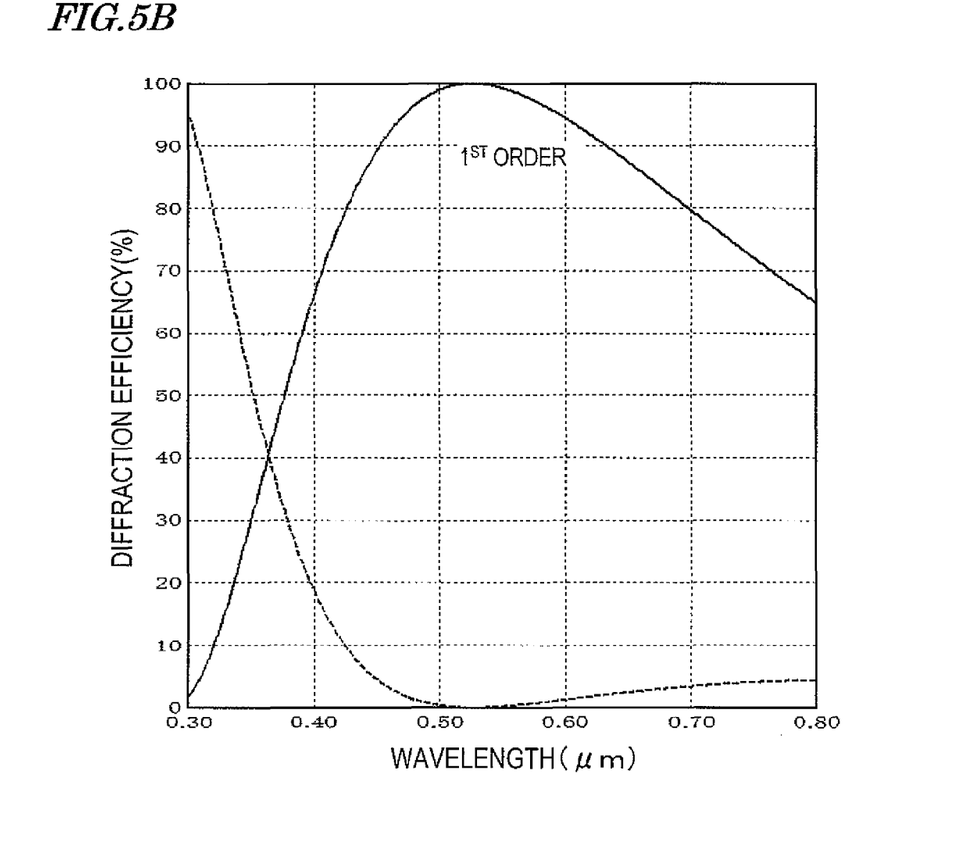
[FIG. 5B] A graph showing a relationship of a diffraction efficiency with respect to a wavelength at the grating (1b) according to the first embodiment.

Note that, the diffraction efficiency shown in FIG. 3B can be described as follows. FIG. 4A illustrates a cross-sectional shape of the grating 1a. The grating 1a having the depth $d_1$ diffracts the incident light 4a to obtain diffracted light 4b'. FIG. 4B shows a relationship of a diffraction efficiency with respect to a wavelength when the depth $d_1$ of the grating is 1.55 μm. When the wavelength is 0.405 μm, the efficiency of the $2^{nd}$-order diffracted light is 100%, and for the wavelengths of 0.660 and 0.785 μm, the efficiencies of the $1^{st}$-order diffracted light are 89.3% and 100%, respectively. FIG. 5A illustrates a cross-sectional shape of the grating 1b. The grating 1b having the depth $d_2$ diffracts the incident light 4a to obtain diffracted light 4b". FIG. 5B shows a relationship of a diffraction efficiency with respect to a wavelength when the depth $d_2$ of the grating is 1.03 μm. The efficiency of the $1^{st}$-order diffracted light is 69.2% for the wavelength of 0.405 μm, and the efficiencies are 85.9% and 66.9% for the wavelengths of 0.660 and 0.785 μm, respectively. Therefore, in the case of FIG. 3A where the gratings 1a and 1b are formed at shifted positions in the same plane with the directions of the grating vectors being aligned, the diffraction efficiency as a whole (FIG. 3B) corresponds to the product of the diffraction efficiencies (FIGS. 4B and 5B) of the constituent gratings.

On the other hand, the diffraction by the gratings 1a and 1b occurs separately, and the phase change (diffraction power) received by the light in being diffracted through the two gratings is proportional to the sum of the diffraction orders of the gratings. Specifically, the sum of the diffraction orders is the $3^{rd}$ order for the blue wavelength, and is the $2^{nd}$ order for each of the red and infrared wavelengths, which satisfies the condition that can minimize the aberration occurring from the difference in light transmitting layer thickness as in the conventional example. In addition, in this embodiment, the phase function of the grating 1a is changed to 1/a times, and the phase function of the grating 1b is changed to a times. In other words, the diffraction power is changed to 1/a times on the side of the grating 1a, and to a times on the side of the grating 1b. The diffraction order is proportional to the diffraction power, and hence when the diffraction powers for the blue, red, and infrared wavelengths at the grating 1a are denoted by $p_1$, $q_1$, and $r_1$, the following equation is established:

$$p_1 : q_1 : r_1 = 1b : 1/a : 1/a. \quad \text{(Equation 3)}$$

Further, when the diffraction powers for the blue, red, and infrared wavelengths at the grating 1b are denoted by $p_2$, $q_2$, $r_2$, the following equation is established:

$$p_2 : q_2 : r_2 = a : a : a. \quad \text{(Equation 4)}$$

Therefore, when the diffraction powers are summed, the diffraction powers p, q, and r for the blue, red, and infrared wavelengths generated by the two gratings may be expressed by the following equation:

$$p : q : r = (p_1 + p_2) : (q_1 + q_2) : (r_1 + r_2) = (1b + a) : (1/a + a) : (1/a + a). \quad \text{(Equation 5)}$$

For example, when a=1.15, the following equation is obtained:

$$p : q : r = 2.89 : 2.02 : 2.02. \quad \text{(Equation 6)}$$

Figure 6A:
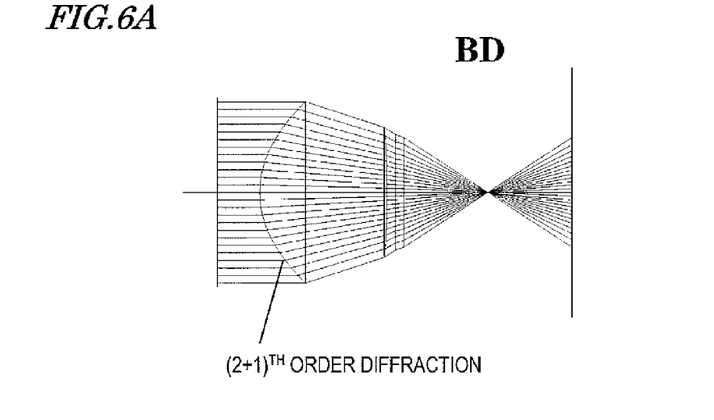
[FIG. 6A] A ray tracing result of blue light according to the first embodiment.
Figure 6B:
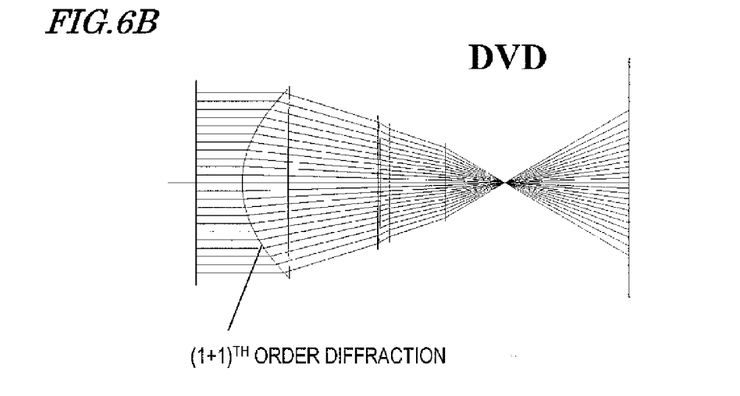
[FIG. 6B] A ray tracing result of red light according to the first embodiment.
Figure 6C:
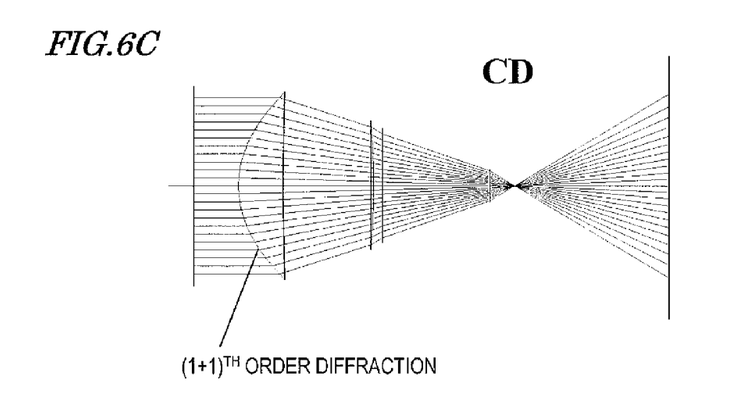
[FIG. 6C] A ray tracing result of infrared light according to the first embodiment.

Therefore, p/q=1.43, and hence p/q≈1.5 can be attained without using a material having a high dispersion for the lens base. When the optical pickup was actually designed with a=1.15 based on the guidelines of (Equation 1) and (Equation 2), with the condition that the NA is 0.5, the aberrations of the BD, the DVD, and the CD could be reduced to about 28, 14, and 6 mλ, respectively, while the chromatic aberration of the BD is maintained to 0.3 μm/nm or lower (design plan B). FIGS. 6A, 6B, and 6C illustrate the ray tracing results obtained at that time.

As described above, this embodiment is not significantly different from the conventional example in terms of the efficiency. However, it is a great advantage over the conventional example that the aberration and the chromatic aberration occurring from the three different light transmitting layer thicknesses of the discs may be minimized by using the UV resistant resin having a low dispersion. Specifically, according to the first embodiment, the diffraction efficiency as high as over 65% may be ensured for all the three wavelengths of blue, red, and infrared with a single lens. In addition, with the configuration of the infinite system, the aberration and the chromatic aberration occurring from the three different light transmitting layer thicknesses of the discs may be minimized. Further, the UV resistant resin is used for the lens base portion 1 having a long optical path length, and hence there may be provided a cheap and stable optical disc device capable of supporting high power light having the blue wavelength.

Note that, in the above description, uniform coefficient values of 1/a and a are multiplied to the phase functions of the gratings 1a and 1b. However, the phase functions may be independently set, and in this case, the flexibility in design is significantly increased and hence the aberration may be further reduced. Further, in the above description, the lens surface 1A on which the gratings 1a and 1b are formed is in contact with air, but another transparent layer may be laminated thereon. Further, the embodiments described above are for a region (that is, within the NA of 0.5 or 0.45) through which the three wavelengths of the objective lens effectively pass. The other region (outside the NA of 0.5 or 0.45) is a region through which only two wavelengths (blue and red) or a single wavelength (blue) effectively passes and for which the problems of the efficiency and the aberration may be solved easily with a combination of conventional technologies, and hence is not mentioned.

Note that, the optical disc device according to the present invention is not limited to the device having the configuration illustrated in FIG. 1, and may have another configuration as long as the optical disc device may include and operate with the optical pickup according to the embodiment of the present disclosure.

INDUSTRIAL APPLICABILITY

The objective lens in the optical pickup according to the present disclosure may ensure a high diffraction efficiency for the three wavelengths of blue, red, and infrared with a single lens. Further, even when the light incident on the lens is configured as the infinite system, the aberration and the chromatic aberration occurring from the three different light transmitting layer thicknesses of the discs may be minimized. Therefore, the optical disc device, which has heretofore required two or more objective lenses, may be simplified significantly and is useful as an optical disc device for a recorder or an optical drive for a personal computer.

REFERENCE SIGNS LIST 1 lens base
1a, 1b grating
4a plane incident light
4b diffracted light
5 light transmitting layer
6a blue light source
6b red and infrared light source
7 dichroic mirror prism
8 collimating lens
L optical axis
50 information layer
100 objective lens
200 optical disc
500 optical disc device
501 optical pickup
502 transfer motor
503 spindle motor
505 control unit
506 non-volatile memory

The invention claimed is:

1. An optical pickup, comprising:
at least one light source for selectively emitting three light beams having blue, red, and infrared wavelengths, respectively; and
an objective lens arranged so that each of the three light beams enters thereto,
wherein the objective lens has a blazed grating structure, the blazed grating structure comprising:
- a first grating having phase steps arranged concentrically around a center axis of a lens in a region in which all the three light beams pass, for diffracting the three light beams having the blue, red, and infrared wavelengths in a $2^{nd}$ order, a $1^{st}$ order, and a $1^{st}$ order, respectively; and
- a second grating formed in the same plane as the first grating and having phase steps arranged concentrically around the center axis of the lens in the region in which all the three light beams pass at positions different from positions of the phase steps of the first grating, for diffracting the three light beams having the blue, red, and infrared wavelengths in a $1^{st}$ order, a $1^{st}$ order, and a $1^{st}$ order, respectively, and wherein the objective lens diffracts the three light beams having the blue, red, and infrared wavelengths in a $3^{rd}$ order, a $2^{nd}$ order, and a $2^{nd}$ order, respectively.

2. The optical pickup according to claim 1, wherein, when n is an integer of 1 or more, a position of an n-th phase step of the first grating counted from the center axis of the lens is located on an outer circumference side with respect to a position of an n-th phase step of the second grating counted from the center axis of the lens.

3. The optical pickup according to claim 1,
- wherein the phase steps of the first grating are deeper than the phase steps of the second grating, and
- wherein the blazed grating structure includes a region in which two kinds of phase steps having different depths are arranged alternately in a radial direction of the lens.

4. The optical pickup according to claim 1, wherein the blazed grating structure is defined by a phase function obtained by adding a phase function defining the first grating and a phase function defining the second grating.

5. An optical disc device, comprising:
- a driver unit for rotating an optical disc;
- the optical pickup according to claim 1; and
- a control unit for controlling the optical pickup and the driver unit so as to read data recorded on the optical disc by the optical pickup.

* * * * *